Dec. 8, 1931.  C. P. CLARK ET AL  1,835,932
INTERNAL COMBUSTION ENGINE
Filed April 25, 1927  3 Sheets-Sheet 1
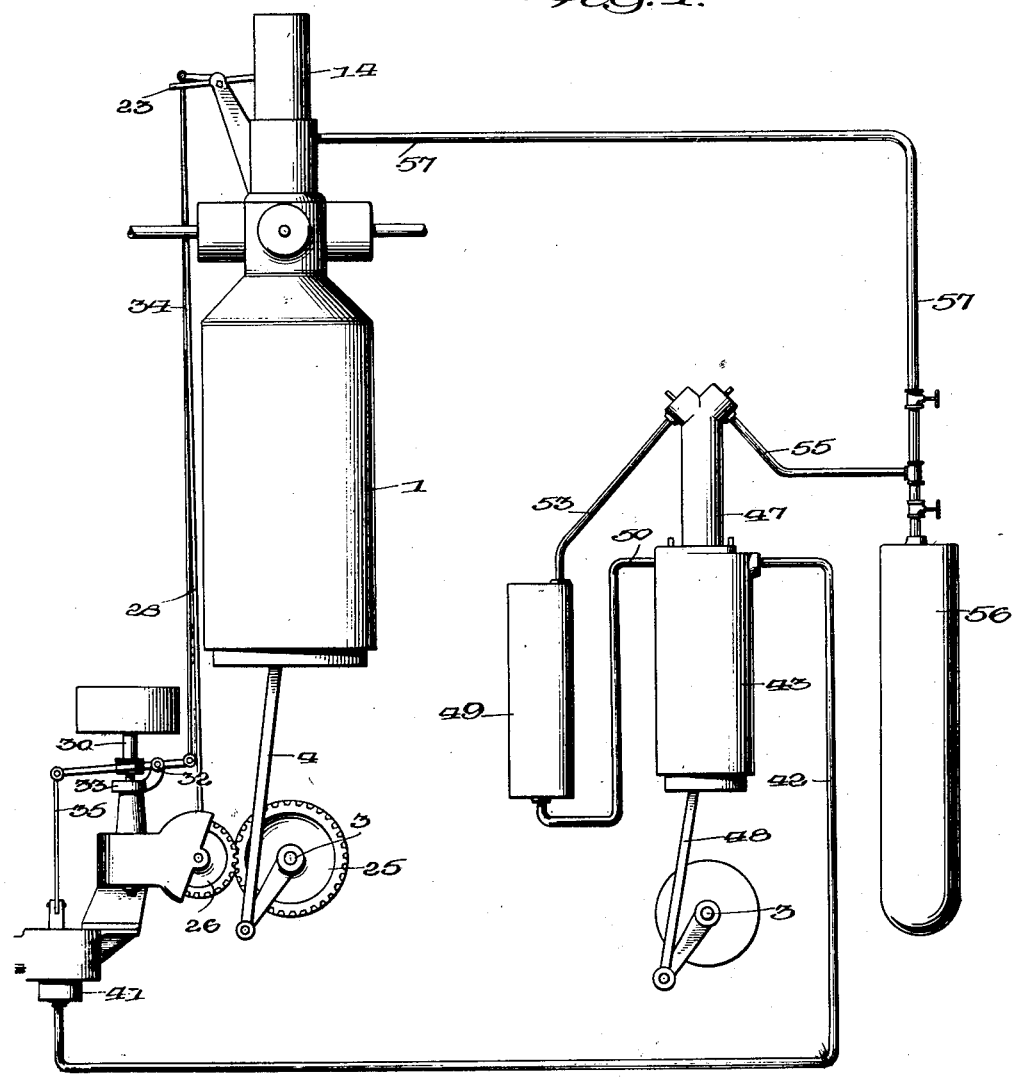

Dec. 8, 1931.   C. P. CLARK ET AL   1,835,932
INTERNAL COMBUSTION ENGINE
Filed April 25, 1927    3 Sheets-Sheet 2
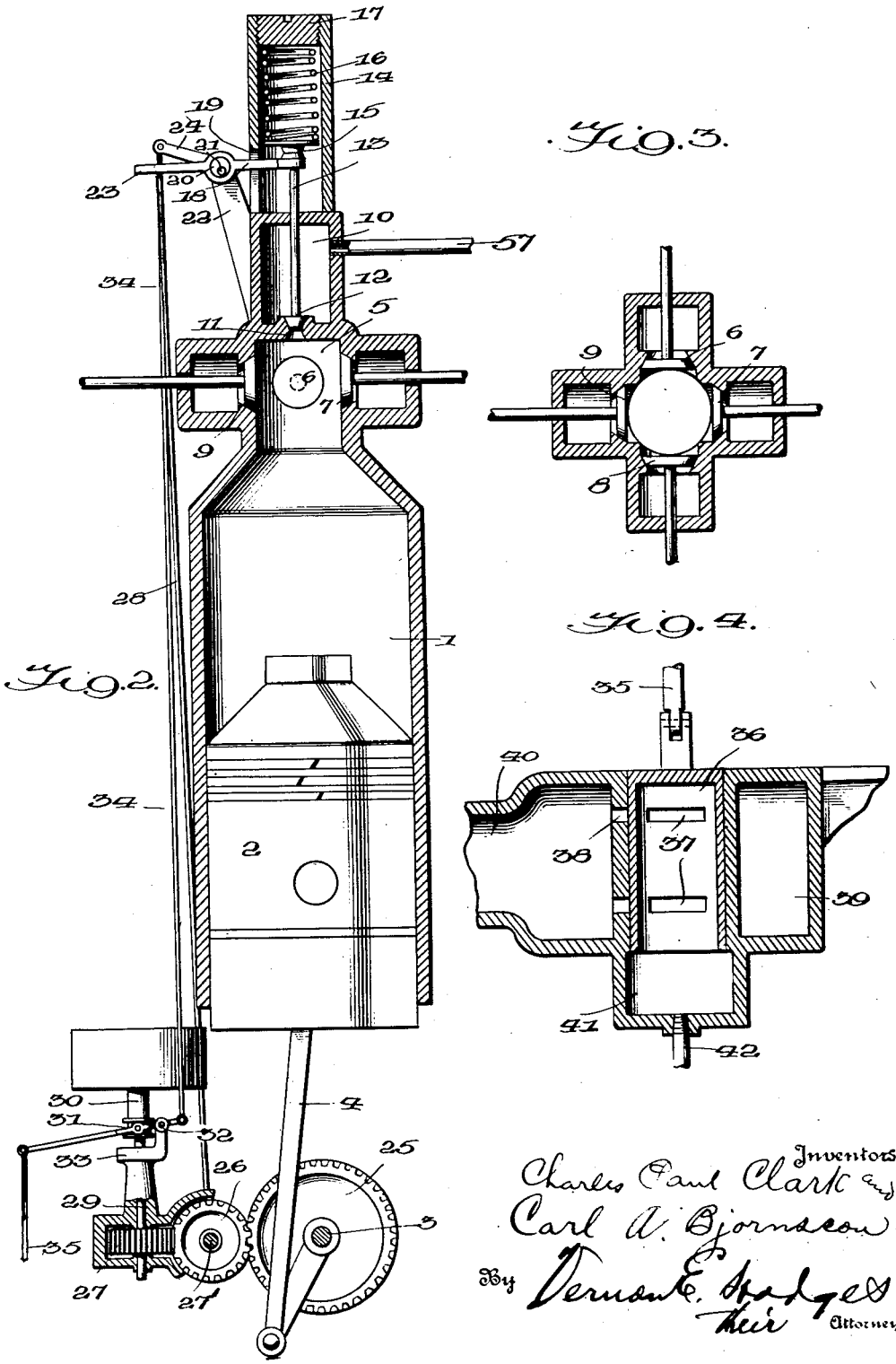

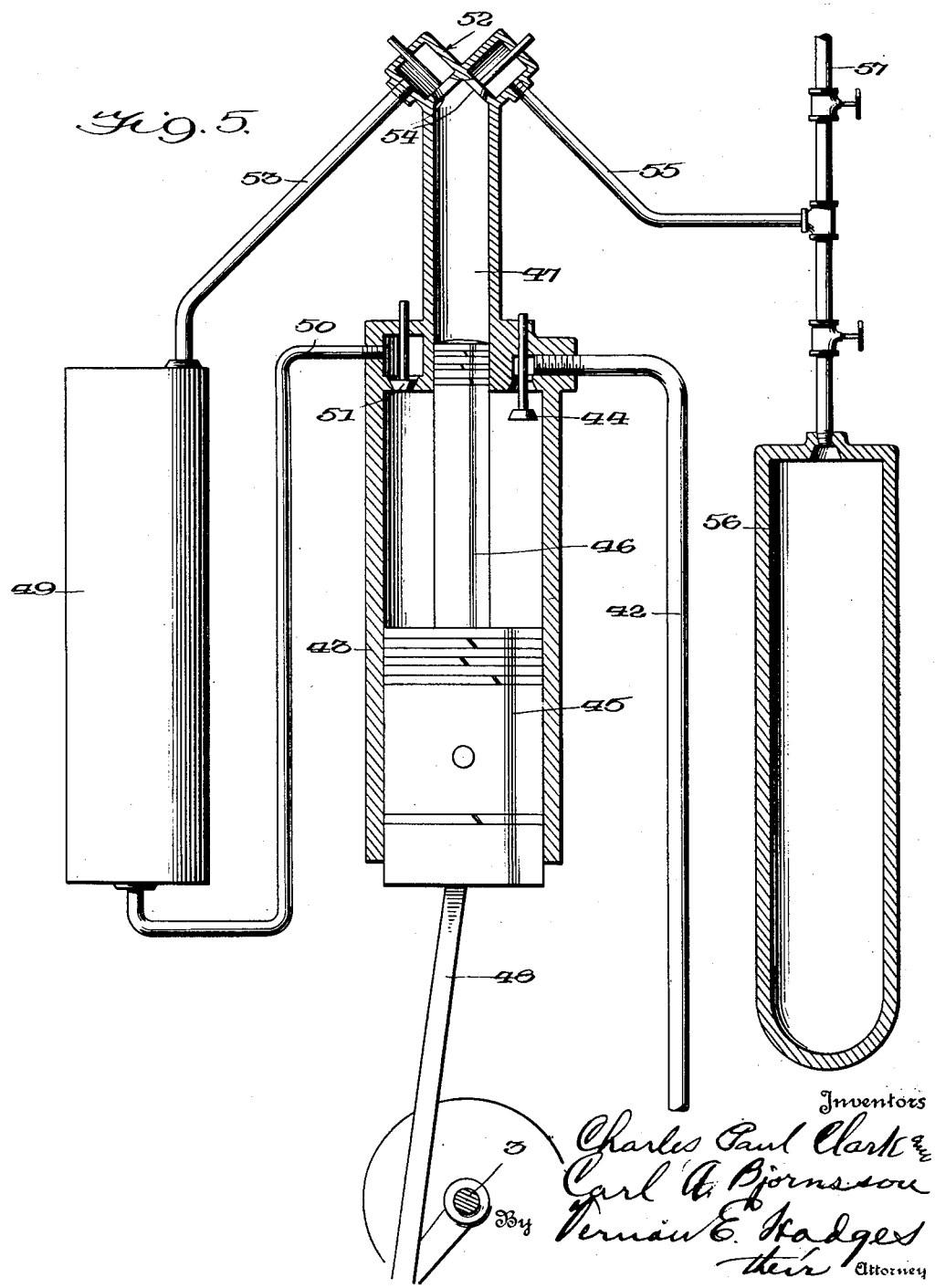

Patented Dec. 8, 1931

1,835,932

UNITED STATES PATENT OFFICE

CHARLES PAUL CLARK, OF OLEAN, AND CARL A. BJORNSSON, OF WELLSVILLE, NEW YORK, ASSIGNORS TO CLARK BROTHERS COMPANY, OF OLEAN, NEW YORK, A CORPORATION OF NEW YORK

INTERNAL COMBUSTION ENGINE

Application filed April 25, 1927. Serial No. 186,328.

This invention relates to an improvement in internal combustion engines.

The object of the invention is to provide an internal combustion engine which may be actuated by the gases resulting from the combustion of a gaseous fuel, injected at high pressure and velocity into the cylinder at or about the conclusion of the compression stroke. The heat resulting from compression of air to a high temperature is the sole means of igniting the charge of fuel. The combustion proceeds at partly constant volume and partly constant pressure, the former being at the early part of the injection period and the constant pressure being maintained for the remainder of the period.

To accomplish this, the injection period is short and the gaseous fuel enters the cylinder under high velocity causing a great turbulence and intermixing of the gas and air.

A further object of the invention is to provide an engine of this character which is in the nature of a Diesel engine, which will automatically regulate the feeding of gaseous fuel to the cylinder according to the nature of the load.

When the load is heavy, a greater quantity of gas is admitted to the combustion cylinder whereas for a light load the supply is decreased. This is regulated by a governor connected with the crank shaft of the engine, which controls the period of opening of the fuel injection valve.

The engine may be of the four stroke cycle or the two stroke cycle type. With both types the cylinder is filled with air of atmospheric pressure and the air is compressed by the working piston to a pressure necessary to raise the temperature at the end of compression to about 1100° F. Into this highly compressed and heated air, slightly before the piston reaches the end of the stroke, is injected, under a pressure somewhat higher than the compression pressure, the gaseous fuel, which at the beginning of the combustion period burns at constant volume and for the remainder of the injection period at constant pressure. In order to reach the highest thermal efficiency of the cycle, the fuel injection period is short. The pressure exerted by the burning charge produces the power impulse on the piston.

In the accompanying drawings:

Fig. 1 is a diagrammatical view of the engine with its fuel feeding mechanism;

Fig. 2 is a vertical section through the cylinder;

Fig. 3 is a horizontal section through the cylinder head;

Fig. 4 is a vertical section through the gas throttle; and

Fig. 5 is a section through the gas compressor and associate mechanism.

A four-cycle engine is illustrated diagrammatically in the drawings and it may have one or more cylinders 1, in which is mounted a piston 2 connected with a crank shaft 3 by a connecting rod 4. The cylinder head terminates in a mixing chamber 5 with which several passages communicate by means of the valves 6, 7, 8 and 9 arranged about the mixing chamber 5, as clearly shown in Figs. 2 and 3. The valve 6 controls the starting air inlet; the valve 7, the exhaust outlet; the valve 8, a relief valve; and the valve 9, controlling the main air inlet.

Arranged above the mixing chamber 5 over the end of the cylinder 1 is a fuel chamber 10, which communicates with the mixing chamber 5 through a passage 11 controlled by an injection valve 12 fixed on the valve stem 13. The upper end of the valve stem 13 extends into a casing 14 and has a plate 15 fixed thereon. A spiral spring 16 is housed in the casing 14 and is interposed between the plate 15 and a head 17 screwed into the upper end of the casing.

The casing 14 is provided with a slot 19 in one side thereof through which a valve lever 18 extends. The lever 18 has its inner end slidably connected with the valve stem 13 or in engagement with the plate 15 for moving the valve 12 from its seat. The valve lever 18 is carried by an eccentric 20 fixed on a shaft 21 mounted in suitable bearings in supporting brackets 22 carried by the cylinder head. The valve lever 18 has an end 23 extending outwardly beyond the eccentric which supports the lever.

A lever 24 is fixed on the shaft 21 for actuating the shaft to rock the valve lever.

A gear 25 fixed on the crank shaft 3 meshes with a pinion 26 which, in turn, meshes with a gear 27. The pinion 26 is mounted on a shaft 27' and which carries suitable timing cams for rocking the lever 28, which is connected at its upper end with the outer end 23 of the valve lever 18. The gear 27 is mounted on a shaft 29, which is connected at its upper end with a suitable governor for controlling a sleeve 30, over which is connected a yoke 31 pivoted as at 32 to the housing 33 and having its outer end pivoted to the push rod 34 connected at its upper end with the lever 24 for rocking the eccentric 20.

At its opposite end the yoke 31 is pivoted to a lever 35, which, as shown in Fig. 4, controls a gas throttle and is connected with a valve sleeve 36 in which slots 37 are arranged for establishing communication through slots 38 with the supply chamber 39, arranged about the sleeve 36 and communicating with any suitable source of gaseous fuel supply through a pipe 40. The sleeve 36 operates in a chamber 41 which communicates by a pipe 42 with a gas compressor 43. This communication is regulated by means of a valve 44 actuated in any suitable manner in the compressor 43.

A piston 45 provided with an advance piston 46 operating in a sub-cylinder 47 of the compressor is connected with the crank shaft 3 by means of a connecting rod 48. The compressor 43 communicates with an inner cooler 49 by means of a pipe 50, which communication is controlled by a valve 51 arranged in the head of the compressor. The inner cooler 49 communicates with the head 52 of the sub-cylinder 47 by a pipe 53, and the valves 54 control the passage of the gaseous fuel through the head 52 to the pipe 55, which conducts them to a gas bottle 56 arranged near the engine. A pipe 57 extends from the bottle 56 for conveying the gases which are now under high pressure, after passing through the gas compressor 53, to the fuel injection chamber 10 mounted above the head of the working cylinder 1.

The various valves shown, as for instance the valves 6 to 9, 44, 51 and 54 may be automatically actuated in any suitable manner from the working parts of the engine or other suitable control mechanism.

In the operation of the engine, the gaseous fuel is directed through the pipe 40, through the gas throttle and the pipe 42 into the compressor which puts it under high pressure and forces it through the inner cooler 49 and the pipes 53 and 55 into the gas bottle 56, where it is stored under high pressure. This high pressure fuel passes through the pipe 57 into the injection fuel chamber 10 for admission to the cylinder upon opening of the valve 12. The valve 6 is opened for initially admitting air to the cylinder 1 where it is compressed by the working piston 2 to a pressure necessary to raise its temperature at the end of compression to about 1100° F.

Into this highly compressed and heated air, slightly before the piston reaches the end of its stroke, is injected the gaseous fuel which is under a pressure somewhat higher than the compression pressure. At the beginning of the combustion period, the gaseous fuel burns at constant volume and for the remainder of the injection period at constant pressure. In order to reach the highest thermal efficiency of the cycle, the fuel injection period is short. The pressure exerted by the burning charge produces the power impulse on the piston.

It will be noted that the sole means of igniting the fuel is the heat resulting from the compression of the air to a high temperature into which the gaseous fuel is injected at a higher pressure and velocity at or about the conclusion of the compression stroke. This pressure is applied to the gaseous fuel by the compressor 43 and it is maintained while stored in the high pressure gas bottle 56.

The governor controls the quantity of gas admitted to the sleeve 36. The governor being actuated by the rotation of the crank shaft 3, it will act to raise the sleeve 36 to decrease the quantity of gas to the compressor whenever the load is light, which gives a greater rotation to the governor and causes it to rock the yoke 31 on its pivot for this purpose. When the load is heavy, the sleeve 30 will be lowered by the slower rotation of the governor to lower the sleeve 36 and allow a greater quantity of gas to pass from the pipe 40 to the compressor 43. In this way gas is supplied in quantities proportionate to the load on the engine.

The valve stem 13 is actuated automatically through the lever 28 and the valve lever 18 for unseating the valve 12 to admit a quantity of gaseous fuel to the mixing chamber 5 of the cylinder at regular intervals, but in order to decrease the amount of time which the valve 12 remains open for the admission of the fuel whenever a light load is on the engine, the governor also acts through the rod 34 connected with the lever 24 to rock the eccentric 20 and lower the lever 18 relative to the valve stem 13, which causes a certain amount of lost motion before the lever 18 engages the plate 15 for unseating the valve and likewise after seating the valve again.

In this way if the governor is rotating at high speed, due to the light load being placed on the engine, it draws the rod 34 downward thus causing the lost motion between the lever 18 and the plate 15 thereby decreasing the amount of gaseous fuel supplied to the cylinder.

We claim:—

1. In an internal combustion engine, the combination of a cylinder having a mixing chamber formed in an end thereof, a valve controlled exhaust, an air inlet at a side of the mixing chamber for supplying air thereto for compression within the cylinder, a fuel injection chamber communicating with the end of the mixing chamber for supplying a gaseous fuel to the cylinder in a direction longitudinally of the cylinder and at a pressure greater than that of the compressed air, for intimate mixture therewith and combustion, a valve for controlling the passage of fuel from the injection chamber into the cylinder, a fuel compressor and a high pressure gaseous storage bottle communicating with the fuel compressor and the injection chamber for supplying compressed fuel thereto, and means for automatically regulating the quantities of gas supplied to the compressor, according to the engine load.

2. In an internal combustion engine, the combination of a cylinder having a mixing chamber formed in an end thereof, a valve controlled exhaust, an air inlet communicating with a side of the mixing chamber for supplying air thereto for compression within the cylinder, a fuel injection chamber communicating with the end of the mixing chamber for supplying a gaseous fuel to the cylinder at a pressure greater than that of the compressed air, for intimate mixture therewith and combustion, a valve for controlling the passage of fuel from the injection chamber into the cylinder, a valve stem connected with said valve, a valve lever for actuating the valve stem, and means for moving the valve lever relative to the valve stem for regulating the duration of the opening of the valve.

3. In an internal combustion engine, the combination of a cylinder having a mixing chamber formed in an end thereof, a valve controlled exhaust, an air inlet communicating with a side of the mixing chamber for supplying air thereto for compression within the cylinder, a fuel injection chamber communicating with the end of the mixing chamber for supplying a gaseous fuel to the cylinder at a pressure greater than that of the compresesd air, for intimate mixture therewith and combustion, a valve for controlling the passage of fuel from the injection chamber into the cylinder, a valve stem connected with said valve, a spring pressed plate fixed on said valve stem for automatically closing the valve, a valve lever slidably mounted on the valve stem for engaging the plate to open the valve, an eccentric mounting for the valve lever, and means for automatically moving said eccentric to move the valve lever relative to the valve stem according to the engine load for regulating the duration of the injection of gaseous fuel into the cylinder.

4. In an internal combustion engine, the combination of a cylinder, a piston operating therein, a crank shaft connected with and operated by the piston, a governor responsive to the operation of the crank shaft, a pivoted yoke connected with the governor, a valve sleeve connected with the yoke, and having slots formed therein, and a valve casing surrounding the sleeve and having corresponding slots formed therein for controlling the supply of fuel through the valve for supplying the engine cylinder.

5. In an internal combustion engine, the combination of a cylinder having a mixing chamber in an end thereof, an air inlet communicating with said mixing chamber, a fuel injection chamber communicating with the mixing chamber for supplying gaesous fuel to the cylinder, a valve for controlling the passage of fuel from the injection chamber to the cylinder, a valve stem connected with said valve, a valve lever for actuating the valve stem, and means for moving the valve lever relative to the valve stem for regulating the duration of the opening of the valve.

6. In an internal combustion engine, the combination of a cylinder having a mixing chamber at an end thereof, a fuel injection chamber adapted to communicate with the mixing chamber for supplying fuel to the cylinder, a valve for controlling the passage of fuel from the injection chamber to the cylinder, a valve stem connected with the valve, a valve lever for actuating the valve stem, means for moving the valve lever relative to the valve stem for regulating the duration of the opening of the valve, and a power piston operatively mounted in the cylinder.

In testimony whereof we affix our signatures.

CHARLES PAUL CLARK.
CARL A. BJORNSSON.